United States Patent [19]

Shibata et al.

[11] Patent Number: 4,792,969
[45] Date of Patent: Dec. 20, 1988

[54] LINE CONDITION DATA COLLECTING SYSTEM FOR A TELEPHONE EXCHANGE

[75] Inventors: Yuji Shibata; Atsushi Fujihira, both of Kawasaki, Japan

[73] Assignee: Fujitsu Limited, Kawasaki, Japan

[21] Appl. No.: 118,946

[22] Filed: Nov. 10, 1987

[30] Foreign Application Priority Data

Nov. 13, 1986 [JP] Japan ............................ 61-270589
Nov. 13, 1986 [JP] Japan ............................ 61-270590

[51] Int. Cl.⁴ .................................... H04M 3/00
[52] U.S. Cl. ............................ 379/242; 379/297; 379/269; 379/381
[58] Field of Search ............... 379/9, 242, 196, 197, 379/297, 269, 381

[56] References Cited

U.S. PATENT DOCUMENTS 4,232,199 11/1980 Beatwright et al. ............ 379/201

FOREIGN PATENT DOCUMENTS

61-189096 8/1986 Japan ............................ 379/242

Primary Examiner—Stafford D. Schreyer
Attorney, Agent, or Firm—Staas & Halsey

[57] ABSTRACT

A line condition data collecting system for a telephone exchange includes an image memory in a central processing unit which stores line condition data to reduce the amount of time the central controller in the central processing unit waits for the line condition data. A signal receiving memory in the telephone exchange stores the line condition data and is sequentially accessed by an image memory controller autonomously from the central controller in the central processing unit. When the central controller requires line condition data, the image memory is checked and if the line condition data stored therein is valid, it is supplied to the central controller. If the line condition data in the image memory is invalid, a conventional access request is made to the signal receiving memory, but this occurs less frequently than in a conventional system.

10 Claims, 11 Drawing Sheets

LINE CONDITION DATA COLLECTING SYSTEM FOR A TELEPHONE EXCHANGE

BACKGROUND OF THE INVENTION

1. Field of the Invention

The present invention relates to a line condition data collecting system for a telephone exchange and, more particularly, to a line condition data collecting system for the central processing unit (CPU) of an exchange.

2. Description of the Related Art

In a telephone exchange, the central processing unit (CPU) periodically collects line data to check on the origination of a call by a subscriber. This requires the CPU to consume a significant amount of time, resulting in deterioration of processing efficiency.

Figure 1A:
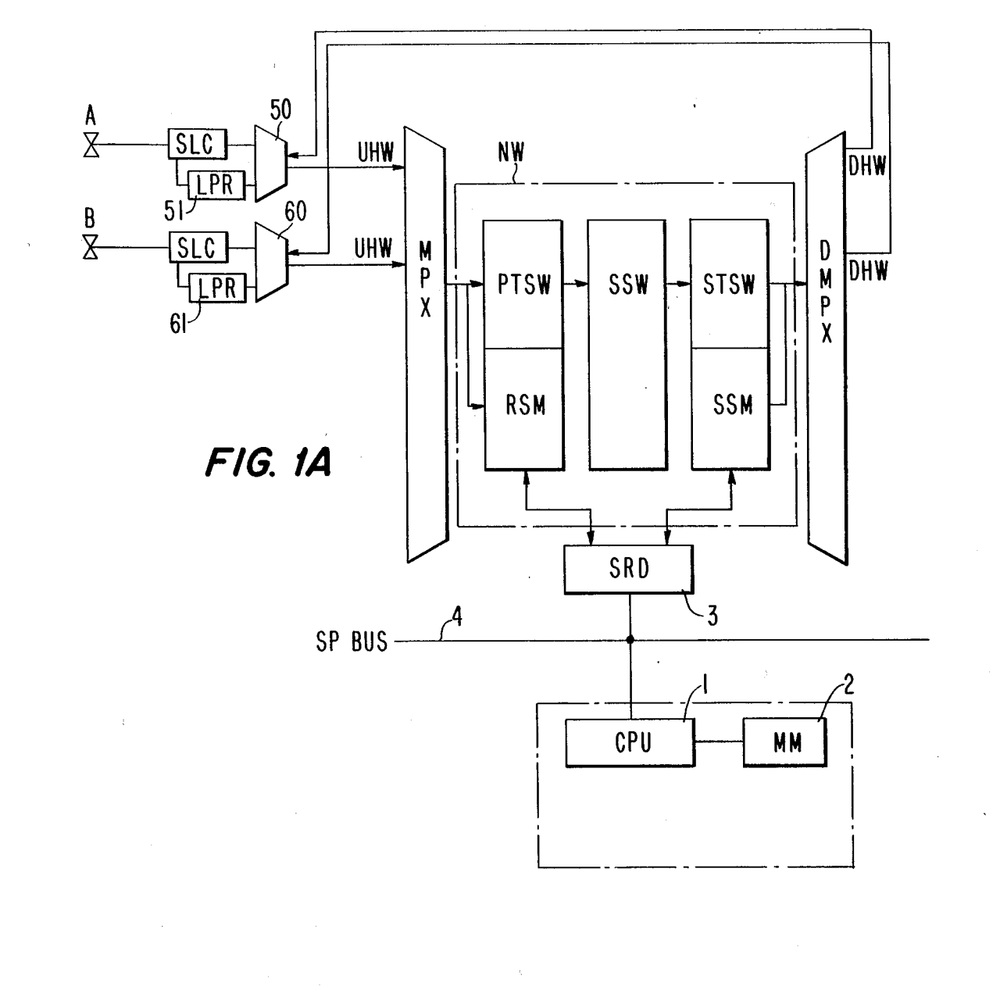
FIG. 1A is a block diagram of the system structure of a typical time division exchange.

FIG. 1A is a block diagram of the system structure of a time division exchange. A subscriber line telephone set A is connected to a line concentrating and demultiplexing device 50 via a subscriber line and a subscriber circuit SLC. An up-highway UHW is formed by multiplexing the subscriber line with other subscriber lines in the line concentrating and demultiplexing device 50. A line processor (LPR) 51 watches the "off-hook" and "on-hook" conditions of each subscriber telephone set connected to the line concentrating and demultiplexing device 50 and generates line condition data corresponding to each subscriber.

The line condition data generated by the line processor (LPR) 51 is sent to the up-highway UHW after being multiplexed together with voice data in the line concentrating and demultiplexing device 50. Similar processing is performed in the LPR 51 and the line concentrating and demultiplexing device 60 which services subscriber B. The up-highways UHW are further multiplexed to a single line by multiplexing device MPX and then input to a network NW. As is well known, the network NW is composed of a primary time switch PTSW, a space switch and a secondary time switch. The voice data is sent through the network NW, while the line condition data generated by the line processors 51 and 61 is stored in a signal receiving memory RSM.

The central processing unit (CPU) 1 monitors the origination of a call by periodically reading the line condition data of each subscriber stored in the signal receiving memory RSM. The CPU 1 can also execute a command which instructs one of the line processors (LPR) 50 or 60 to send a ringing signal, etc., to the signal sending memory SSM.

A demultiplexing device DMPX executes an operation which is the reverse of that performed by the multiplexing device MPX and supplies the separated lines to down-highways DHW. Each separated down-highway DHW is further separated by the line concentrating and demultiplexing devices 50, 60 and is connected to the corresponding subscriber line and circuit SLC. The identified line processor LPR receives a command read from the signal sending memory SSM by the line concentrating and demultiplexing devices 50, 60 and executes the specified processing.

Figure 1B:
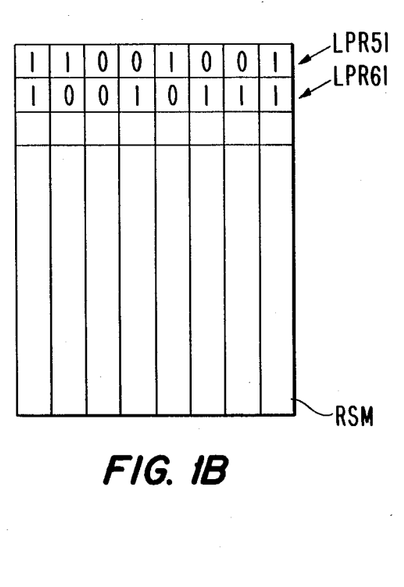
FIG. 1B is an example of line condition data stored in a signal receiving memory.

For example, the line processors (LPR) 51, 61 may each monitor eight (8) subscribers, so that one bit o an 8-bit word is assigned to each subscriber telephone set indicating "off-hook" as "1" and on-hook as "0". Therefore, as indicated in FIG. 1B, the RSM stores eight bits of data generated by the line processors (LPR) 51, 61 as one word. The command to the line processors (LPR) 51, 61 from the CPU 1 is also stored in the SSM in the same way.

Figure 2:
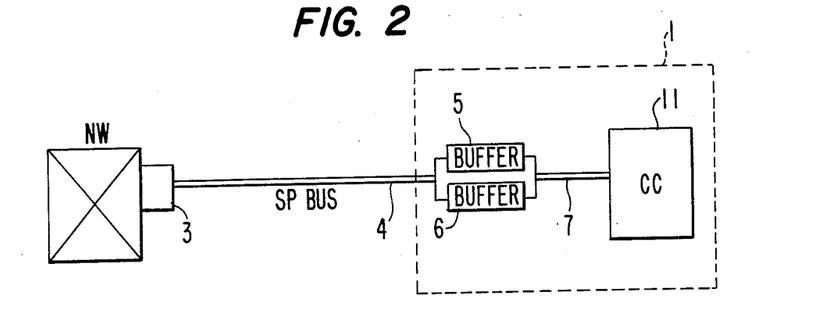
FIG. 2 is a block diagram of the connection between a central processing unit and a network.

The central processing unit CPU 1 accesses the signal receiving memory RSM through a slow speed bus (SP BUS) 4 and a signal receiving distributor (SRD) 3 to read the subscriber condition data stored in the signal receiving memory RSM. This process is described below with reference to FIGS. 2 and 3. FIG. 2 illustrates the connections between the CPU 1 of FIG. 1A and the network and FIG. 3 is a diagram for explaining the operation of FIG. 2.

Figure 3:
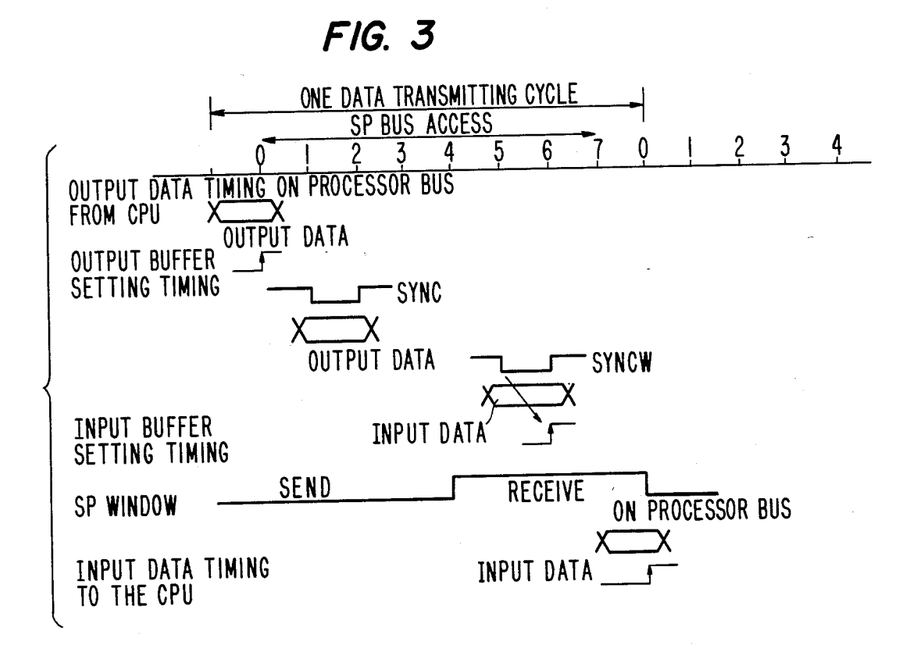
FIG. 3 is a timing chart for explaining the operation of FIG. 2.

As indicated in FIG. 3, at the beginning of a data transfer cycle, a central controller (CC) 11 in the CPU 1 transmits data to an output buffer 6 connected to a processor bus 7 (the internal bus of the CPU 1). WWhen data is stored in the output buffer 6, access of the SP BUS 4 connected to the SRD 3 starts. At the time of such access, data in the output buffer 6 is sent to the SP BUS 4 together with the signal SYNCS which indicates the effective period of data.

The data transmitted may be, for example, a readout command for line condition data stored in the signal receiving memory RSM, including the line processor (LPR) number corresponding to an address of 8-bit data (1 word). In this case, the SRD 3 prepares for return data (line condition data read from the RSM) produced in response to the raadout command. Thereafter, the SP BUS 4 changes to the data receiving mode from the sending mode with a predetermined timing controlled by an SP WINDOW signal. Thereby, the return data prepared by the SRD 3 is transmitted to the SP BUS 4 together with the signal SYNCW which indicates the effective period of data. The return data transmitted to the SP BUS 4 generates the input buffer timing signal from the SYNCW signal and stores the return data in the input buffer 5. The CPU 1 monitors the SYNCW signal, while waiting for the completion of data transfer, after transmission of the data to the output buffer 6. A single data transfer cycle terminates when the CPU 1 receives the data from the SP BUS 4.

As indicated in FIG. 3, a large part of one data transfer cycle is used for making access to the SP BUS 4 to read the line condition data from the network (NW) 2. This is due to the SP BUS 4 typically being a low speed bus, which is attributed to the following reasons.

Usually, the CPU 1 and the network (NW) 2 are installed in regions physically isolated from one another and the delay time caused by the length of the SP BUS 4 changes depending on the location of each element. Moreover, since many SRDs 3 are typically connected to the SP BUS 4 and a single CPU 1 typically controls multiple networks, the transfer time of data through an SP BUS 4 is not constant. Accordingly, transfer of data by the SP BUS 4 is carried out by an asynchronous transfer procedure using SYNCS, SYNCW and SW WINDOW. In this asynchronous transfer procedure, a time allowance is given for completing the procedure.

Therefore, the data transfer time through the SP BUS 4 is very long in comparison with the machine cycle of the CPU 1. Meanwhile, the CPU 1, as explained previously, monitors completion of the bus transfer cycle and waits for returning data. During this period, other processing may be carried out.

SUMMARY OF THE INVENTION

An object of the present invention is to provide line condition data to the central controller of a processing unit controlling a telephone exchange within a short period of time.

Another object of the present invention is to realize high speed processing without changing the processing procedures of the central controller in the processing unit.

A further object of the present invention is to provide a central processing unit controlling a telephone exchange which efficiently accesses line condition data stored in a receiving signal memory in the telephone exchange without disturbing the operation of the receiving signal memory.

The above objects are attained by providing a line condition data collecting system for a telephone exchange, including signal receiving memory means for holding line condition data of a plurality of lines and processing means for periodically collecting the line condition data and for controlling the telephone exchange. The processing means includes central control means for executing commands controlling execution of the processing means. The commands executed by the central control means include a readout command. The processing means also includes image memory means for sequentially reading the line condition data from the signal receiving means independently of the commands executed by the central control means, for storing validity flags, corresponding to the line condition data, indicating whether the line condition data stored in the image memory means is valid and, in response to execution of the readout command by the central control means, for supplying specific line condition data stored in the image memory means to the central control means if a corresponding validity flag indicates that the specific line condition data is valid.

These objects, together with other objects and advantages which will be subsequently apparent, reside in the details of construction and operation as more fully hereinafter described and claimed, reference being had to the accompanying drawings forming a part hereof, wherein like reference numerals refer to like parts throughout.

DESCRIPTION OF THE PREFERRED EMBODIMENTS

Figure 4:
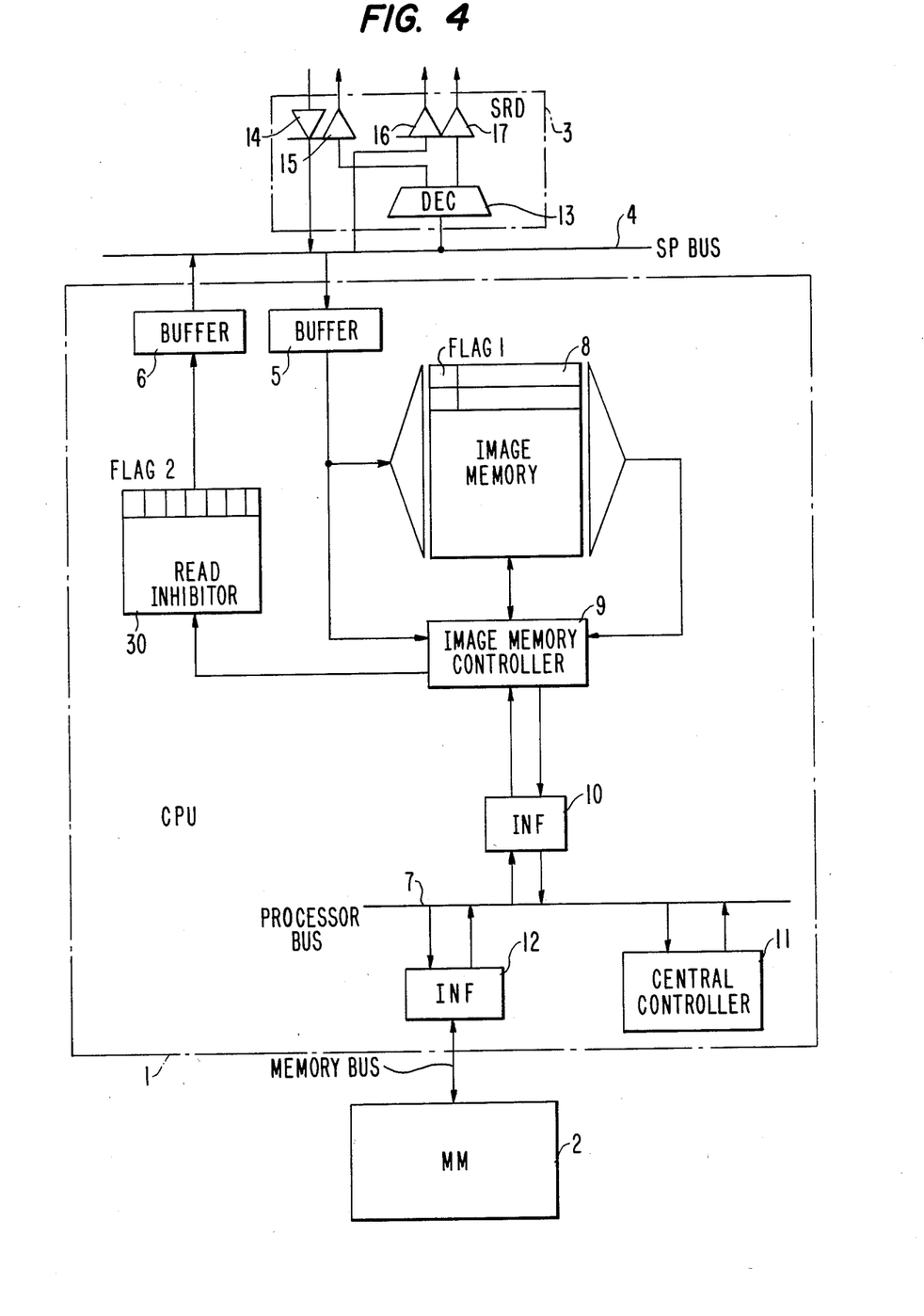
FIG. 4 is a block diagram of the present invention.

FIG. 4 is a block diagram of the principle structure of the present invention. In FIG. 4, a central processing unit (CPU) 1 is connected to a main memory 2 and to a signal receiving distributor (SRD) 3 via an SP BUS 4. Inside the CPU 1, input and output buffers 5 and 6 are connected to the SP BUS 4, a processor bus 7 and an image memory 8. The image memory 8 is connected to buffer 5 and an image memory controller 9. An image memory interface circuit 10 connects the image memory controller 9 with the processor bus 7. A central controller 11 for microprogram and ALU control within the CPU 1 is also connected to the processor bus 7. A main memory interface circuit 12 connects the processor bus 7 and main memory 2. The input buffer 5 and output buffer 6 are connected, via the SP BUS 4, to the SRD 3 which serves as an interface for the signal receiving memory RSM (FIG. 1A) which holds line condition data.

The image memory controller 9 is able to autonomously read the line condition data from the signal receiving memory RSM and store it in the image memory 8. In other words, this operation is performed independently of the central controller 11 of the CPU 1. The central controller 11 in the CPU 1 can then read data from the image memory 8 without requiring an access of the SP BUS 4. Whether the line condition data read from the image memory 8 is valid or not is determined by the image memory controller 9 with reference to validity flags (FLAG1) stored in the image memory 8 together with the line condition data.

The image memory controller 9 read sequentially and autonomously, i.e., independently of the central controller 11, all line condition data stored in the RSM and stores it in the image memory 8 together with validity flags. The central controller 11 is thus able to fetch the line condition data in the image memory 8 via the image memory interface 10 and image memory controller 9 without performing operations to access data via the SP BUS 4. When the central controller 11 fetches specific line condition data from the image memory 8, the image memory controller 9 resets the corresponding validity flag. If the corresponding validity flag for the specific line condition data in the image memory 8 is valid (indicating effective data) when the central controller 11 next fetches the line condition data, this indicates that the image memory controller 9 has read new line condition data from the RSM and the central controller 11 may use the line condition data stored in the image memory 8.

The SRD 3 decodes data sent from the output buffer 6 (an access request from the CPU 1) using a decoder 13, sends an address to the RSM via a driver 15 to read the line condition data and sends the thus accessed data to the input buffer 5 via a driver 14. A driver 16 is provided to send data from the output buffer 6 to the SSM (FIG. 1A), while a driver 17 is provided to send an address to the SSM.

Figure 5:
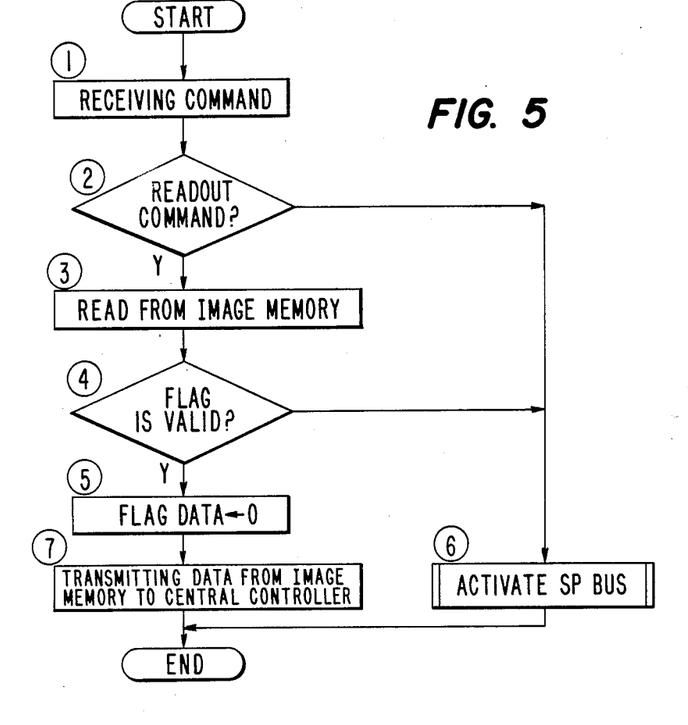
FIGS. 5, 6 and 7 are flow charts for explaining the operation of FIG. 4.

Next, the operation of the image memory controller 9 will be explained with reference to FIGS. 5, 6 and 7. First, FIG. 5 is a flow chart of the processing of commands from the central controller 11 in the image memory controller 9. In steps ① and ② of FIG. 5, upon reception of a readout command memory controller 9 decides whether or not it is a readout command for reading line condition data. If it is not a readout command (for example, if it is a command to the line processor LPR to be stored in the SSM), operation skips to step ⑥. In step ③, specific line condition data (corresponding to line processor N) is read together with a corresponding validity flag from the image memory 8. Upon reading, the flag in the image memory 8 is reset and thereby, the line condition data which has been read is invalidated for subsequent reading by the central controller 11 until it is updated.

In step ④, it is decided whether the validity flag is effective (valid) or not. If the validity flag is invalid, operation skips to the step ⑥. When the validity flag is valid, the line condition data read in step 3 is sent to the central controller 11 in step ⑤.

Figure 6:
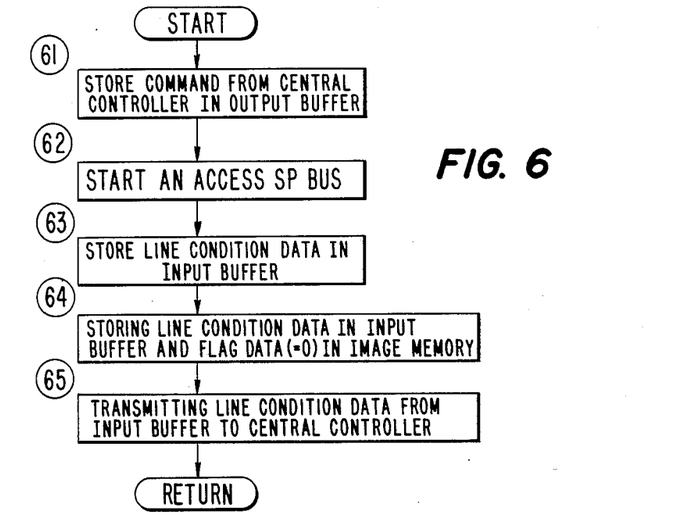
Figure 7:
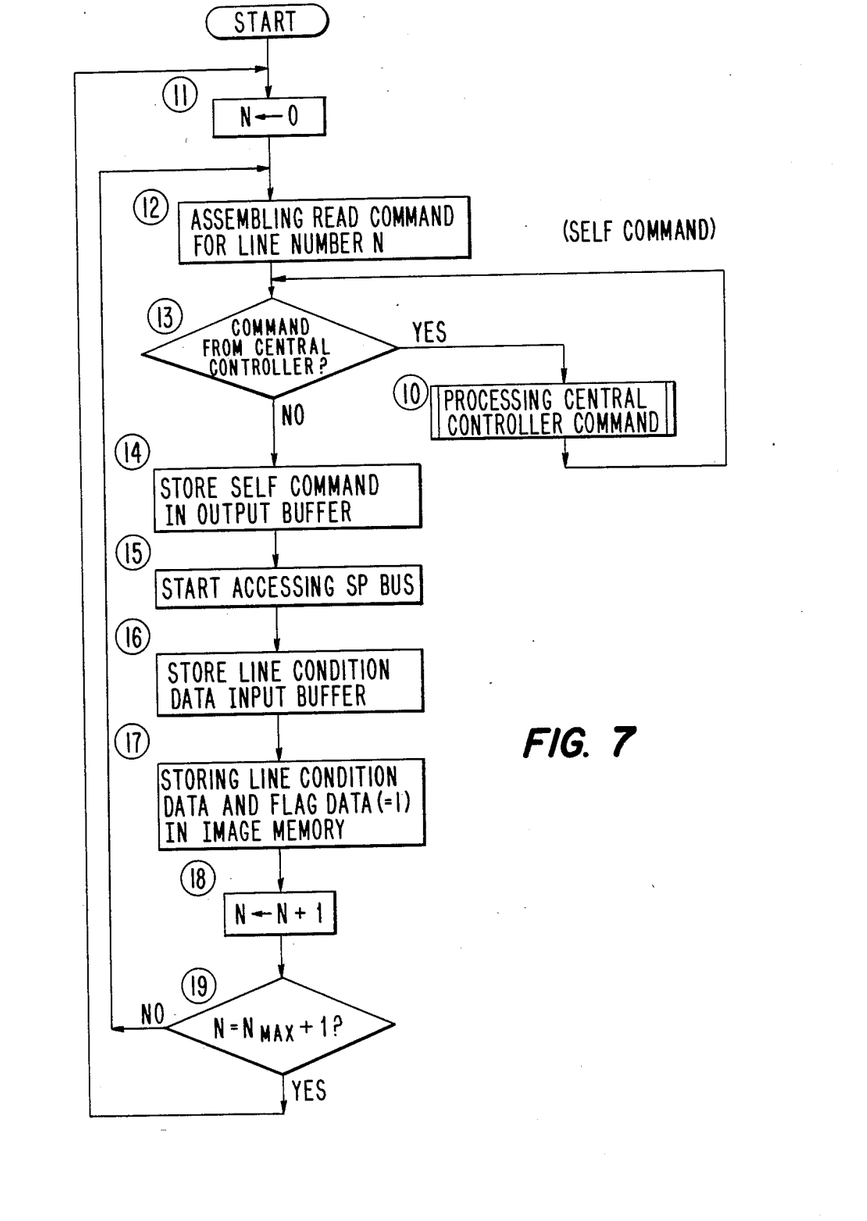

FIG. 6 is a detailed flow-chart of step ⑥ in FIG. 5, regarding the access procedure for the SP BUS 4. In step ㊶, provided the command from central controller 11 is not a readout command for invalid line condition data, the command received in step ① of FIG. 5 is stored in the output buffer 6. Next, in step ㊷, the command stored in the output buffer 6 is sent to the SP BUS 4. Then, the line condition data sent to the SP BUS 4 from the SRD 3 is stored in the input buffer 5 in step ㊸. The contents of the input buffer 5 together with a validity flag of "0" (indicating invalidation) is stored in the image memory 8 in step ㊹. Finally, in step ㊺, the contents of the input buffer 5 are transmitted in succession to the central controller 11 via the image memory interface 10 and processor bus 7. In other words, the line condition data from the SP BUS 4 stored in the input buffer 5 is stored in the image memory 8 together with a validity flag of "0" to indicate that it has also been fetched by the central controller 11.

Next, the procedures followed in the memory controller 9 to autonomously read the line condition data are explained with reference to FIG. 7. In step ⑫ the readout command for line number N is generated and it is stored in a register. This becomes an autonomous readout command executed by the image memory controller 9. In this embodiment, the line number N is the line processor (LPR) number, as explained with reference to FIG. 1B. Whether the command sent from the central controller 11 is received or not is confirmed in step ⑬. When the command is received, operation shifts to the processing of step ⑩. The processing in step ⑩ is the command processing explained with reference to FIG. 5.

If no command from the central controller 11 is received, the autonomous readout command generated in step ⑫ is stored in the output buffer 6 in step ⑭ and is then transmitted to the SP BUS 4 in step ⑮. In step ⑯ the line condition data transmitted from the SRD 3 via the SP BUS 4 is stored in the input buffer 5. Then, a flag of "1" is stored in the image memory 8 together with the line condition data from the input buffer 5 in step ⑰. The address in the image memory 8 corresponds to the line number N. In step ⑱, the line number N is incremented by one in preparation for readout of the next line condition data.

Next, whether the line number N is larger than maximum value $N_{MAX}$ or not is decided in step ⑲. That is, whether or not all line condition data has been read is checked. If the line number N is larger than $N_{MAX}$, step ⑪ is processed next to reset N. Otherwise, step ⑫ is processed next.

Figure 8A:
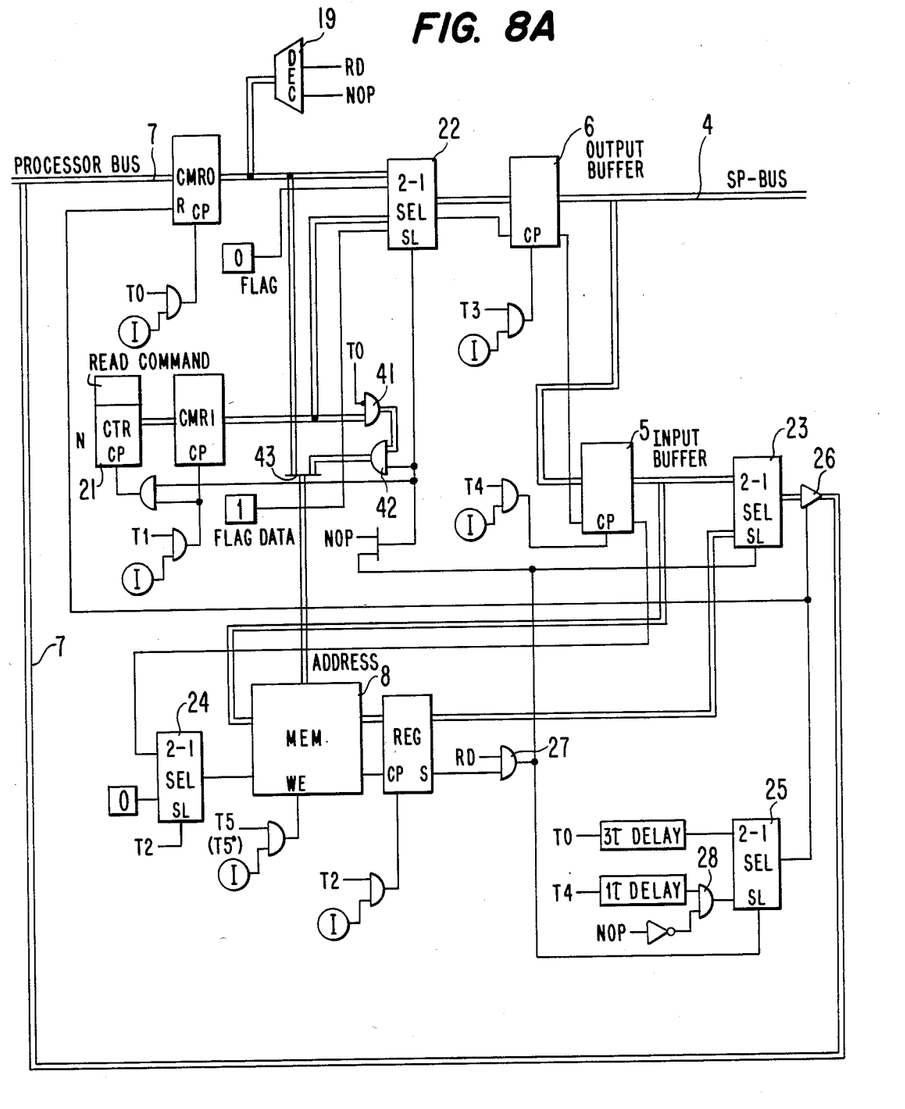
FIGS. 8A and 8B are more detailed block diagrams of the first embodiment.
Figure 8B:
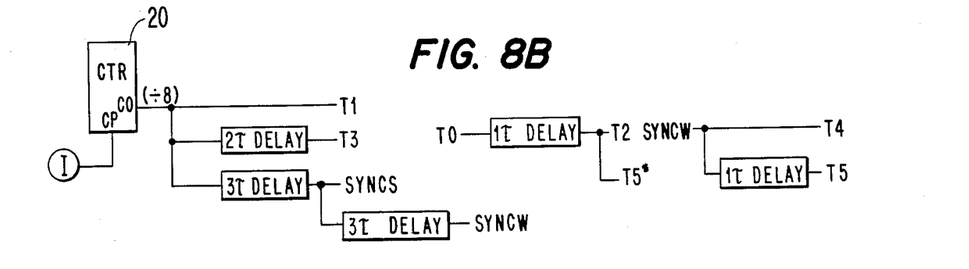

Next, the construction and operation of the image memory 8 and image memory controller 9 will be described with reference to FIGS. 8A and 8B. FIGS. 8A and 8B are more detailed block diagrams of portions of FIG. 4, i.e., the image memory 8, controller 9 and interface 10, for a first embodiment and FIG. 9 is a time chart of the operation of the circuit illustrated in FIG. 8A.

The timing signals T1 to T5 used in the circuit illustrated in FIG. 8A are generated as explained below with reference to FIG. 8B. A timing signal T3 is generated by delaying, for two clock periods ($2\tau$), a timing signal T1. The signal T1 is obtained by dividing reference clock signal CLK ①, which determines the machine cycle of the CPU 1, by eight using a counter (CTR) 20. The signal SYNCS, indicating effectiveness of output data as described with reference to FIG. 3, is generated by delaying the clock signal T1 for $3\tau$. The signal SYNCW (indicating effectiveness or existence of input data) is generated by delaying SYNCS for $3\tau$. The signal SYNCW is the same as clock signal T4 and is further delayed for $1\tau$ to obtain the timing signal T5. These timing signals are generated for each data transfer cycle to control processing in the image memory controller 9. The timing signal T0 is generated with transmission of a command from the central controller 11 and the timing signals T2, T5* are generated by delaying the timing signal T0 for $1\tau$.

Figure 9A:
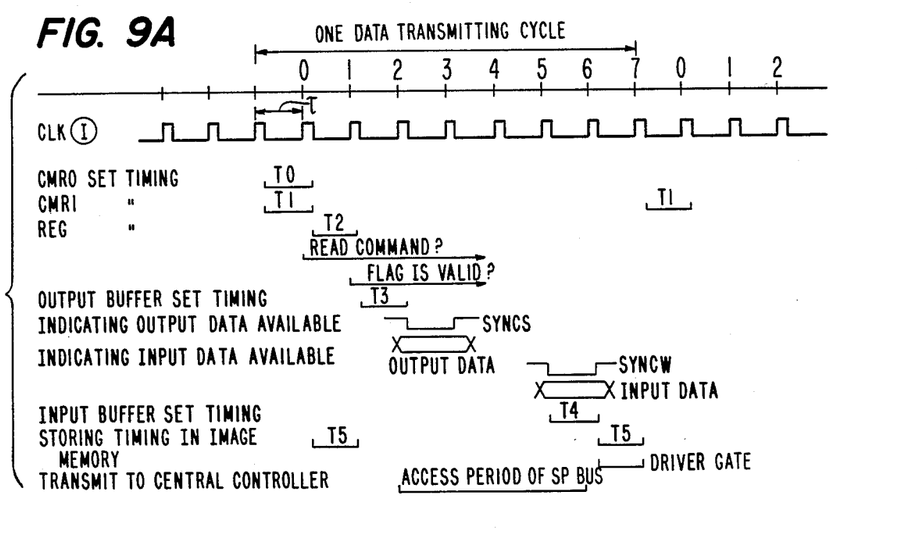
FIGS. 9A and 9B are time charts for explaining the operation of FIGS. 8A and 8B.
Figure 9B:
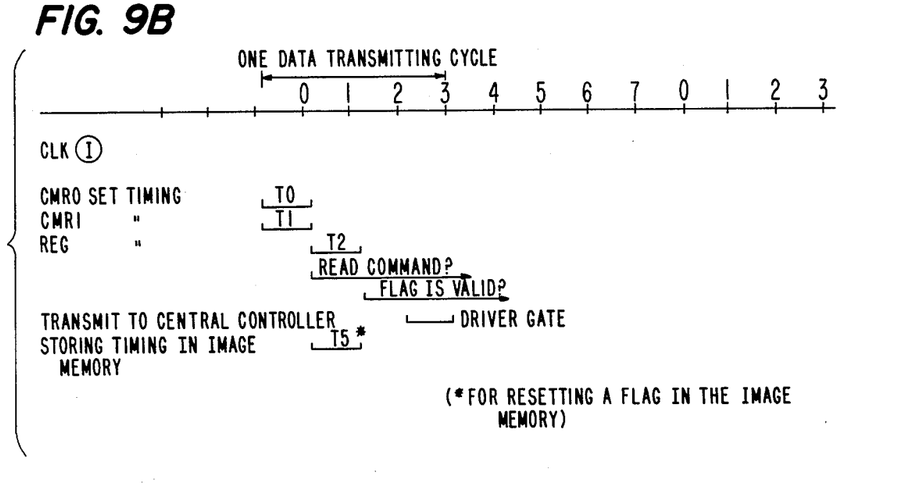

Further explanation of the first embodiment operation will now be made with reference to FIGS. 8A, 9A and 9B. When the central controller 11 reads the line condition data, the data adding the readout command to the line number N is transmitted to the processor bus 7. Simultaneously, the timing signal T0 is transmitted. Upon receipt of this signal T0, the command register CMR0 is set to store the command from the processor bus 7. The command stored in the command register CMR0 is checked by a decoder (DEC) 19. If the command is not the readout command, a "NOP" signal is output from the decoder 19 and input to the select terminal SL of a selector 22. This selects the contents of CMR0 and flag data "0" which are transferred to the output buffer 6 when the timing signal T3 is generated in order to access the SP BUS 4.

The data returned from the SP BUS 4 is stored in the input buffer 5 when the timing signal T4 is generated. At the same time, the flag data "0" from the output buffer 6 is also stored in the input buffer 5. Thereafter, a timing signal obtained at the output of gate 28 by delaying the clock T4 for $1\tau$ is selected by the selector 25 and is supplied to a driver 26 to output the data to the central controller 11 via the processor bus 7.

On the other hand, when the readout command RD is detected by the decoder 19, the contents of image memory (MEM) 8 is read together with the validity flag using the line number N in register CMR0 as the address of the image memory 8. The data read from the image memory 8 is then stored in the readout register REG which is set by the timing signal T2, and the AND gate 27 is opened. When the validity flag is invalid, "0" is output from the AND gate 27, "0" is input to the select terminal SL of selector 22, and the contents of the command register CMR0 are stored in the output buffer 6 to make an access to the SP BUS 4 as in the case of a non-readout command, as described previously.

When the validity flag is valid, "1" is output from the AND gate 27, "1" is input to the select terminal SL of the selector 23 and the selector 23 selects the contents of the register REG. In the same way, "1" is also supplied to the select terminal SL of selector 25, the timing signal obtained by delaying T0 for $3\tau$ is input to the driver 26

(returning timing of processor), its gate is opened in response to the output of the selector 25 and the data is supplied to the central controller 11 via the processor bus 7.

The validity flag in the image memory (MEM) 8 is reset when the validity flag is read and the register REG is set by the timing signal T2. At this time, the image memory (MEM) 8 is write-enabled by the timing signal T5* and the flag data "0" is selected by selector 24 and written into the MEM 8. Since the address of MEM 8 is the same as the readout address (line number), the correspondin validity flag is reset.

When the corresponding validity flag from the MEM 8 indicates invalidity, the line condition data received by accessing the SP BUS 4 is written into the image memory (MEM) 8 simultaneously with transmission of the line condition data to the central controller 11. However, when the line condition data in the RSM is read by the central controller 11, the selector 22 selects the flag data "0" which is input to the image memory (MEM) 8 via the output buffer 6, input buffer 5 and selector 24, and the corresponding validity flag is set to "0".

On the other hand, when the corresponding validity flag at the address indicated by the readout command sent from the central controller 11 is valid, or when the central controller 11 does not send a readout command and the decoder (DEC) 19 outputs the NOP signal, the contents of register CMR1 and flag data "1" are selected by the selector 22 and stored in the output buffer 6. The line number N is supplied by the counter (CTR) 21 to the register CMR1 which stores the readout command when the timing signal T1 is generated. The counter (CTR) 21 increments by one in response to the timing signal T1 and the selection of register CMR1 by the selector 22. The command in the register CMR1 is stored in the output buffer 6 to start accessing the SP BUS 4.

The received line condition data is stored in the input buffer 5 together with the flag data "1" and the line number in register CMR1 is supplied as the address to the image memory (MEM) 8 via AND gates 41 and 42 and OR gate 43. However, in this case, the gate of driver 26 for returning data does not open because the AND gate 28 is closed by a NOP sent through an inverter and nothing is output from the selector 25. Moreover, in this case, the corresponding validity flag is set to the flag data "1" selected by the selector 22 and transmitted via the output buffer 6 and input buffer 5 to MEM 8.

As explained previously, when the readout command is not received from the central controller 11 or when the line condition data read from image memory 8 can be transmitted to the central controller 11, the corresponding validity flag indicates valid line condition data and the image memory controller 9 accesses the SP BUS 4 and collects the line condition data autonomously. Then the image memory controller 9 writes the line condition data to the image memory (MEM) 8 together with a valid flag indication. If the number of readout commands received from the central controller 11 is sufficiently small, almost all readout commands will not require access to the SP BUS 4 and can be responded to with data from the image memory MEM 8 (since the image memory controller 9 is autonomously capable of reading the line condition data until reception of a readout command).

If the image memory (MEM) 8 cannot supply the line condition data, the same line processor number is used to access the SP BUS 4 without waiting for the line condition data to be read autonomously by the image memory controller 9 and the thus read data is written into the image memory (MEM) 8. This operation is described in more detail below.

It is desirable for efficient operation of the image memory 8 that the period for autonomously reading the line condition data is equal to or shorter than the period in which the CPU 1 reads the line condition data for detecting origination of a call. However, the time available to read all line condition data via the SP BUS 4 is naturally limited and it is not rare that the time available is insufficient when the number of lines is very large or the period for detecting origination of a call by the CPU 1 is short. Therefore, in the embodiment illustrated in FIG. 8A, the line condition data not read from the RSM by the image memory controller 9 within the period for detecting origination of a call by the CPU 1 is processed by making direct access to the RSM through the SP BUS 4 by the central controller 11. In this case, care must be taken to prevent readout of a detection error in the autonomous line condition data by the image memory controller 9, due to destruction of the data sampling period.

Figure 10:
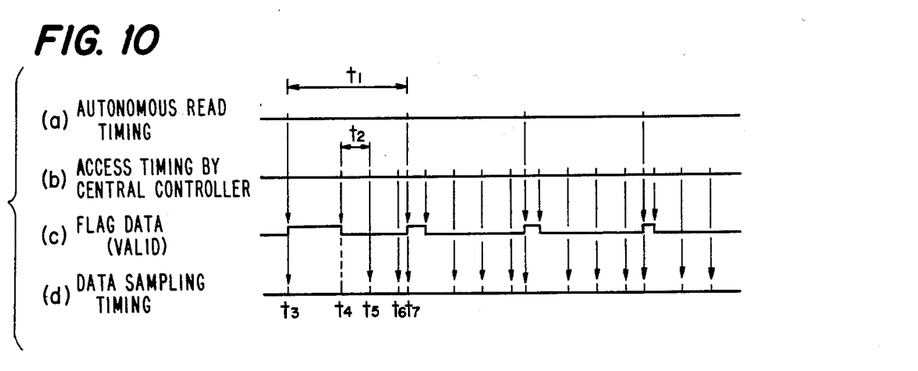
FIG. 10 is another time chart for explaining the operation of FIGS. 8A and 8B.

That is, as illustrated in FIG. 10, the image memory controller 9 autonomously reads the RSM with a period $t_1$ in line (a) and the CPU 1 executes, as indicated in line (b), a readout of line condition data with a period $t_2$. After the image memory controller 9 begins accessing the RSM at time $t_3$, the central controller 11 begins reading the line condition data from the image memory at time $t_4$. In succession, when the central controller 11 next accesses the RSM at time $t_5$, after the period $t_2$ has elapsed, the data sampling period of the RSM is comparatively long, i.e., $t_5-t_3$. Meanwhile, when the central controller 11 makes access to the RSM at the time $t_6$ after another period $t_2$, the data sampling period of RSm is $t_6-t_5$ which is shorter than $t_5-t_3$. Moreover, thereafter, when the image memory controller 9 accesses the RSM again, the data sampling period of the RSM becomes further shortened to $t_7-t_6$. This trend is more distinctive as the period $t_2$ becomes shorter.

As described above, the RSM stores the line condition data collected by the line processor LPR and updates the data periodically. Therefore, the CPU 1 can access the RSM with the same period in order to collect the latest line condition data. However, as indicated in row (d) of FIG. 10, if the data sampling period of the RSM varies, it does not perfectly match the update period of the RSM and thereby the updating of the RSM by data sent from the up-highway UHW may collide with an access of the RSM by the CPU 1. Accordingly, the data sampling period of the RSM is required to be longer than a predetermined period. This requirement does not present a problem because hhe detection period for call origination is comparatively long.

Another way to avoid potential collision in the RSM will now be described. As indicated in FIG. 4, a self-controlled read inhibit means 30 may be further provided. This self-controlled read inhibit means 30 is provided with a read inhibit flag, flag 2 corresponding to each line number of the image memory 8. The read inhibit flag is set by the line condition data readout command sent from the central controller 11 and is reset after the predetermined period for renewal of the RSM. Thereby while the FLAG 2 is set, access by the image memory controller 9 to the corresponding portion of the RSM via the SP BUS 4 and SRD 3 is inhibited.

Figure 11:
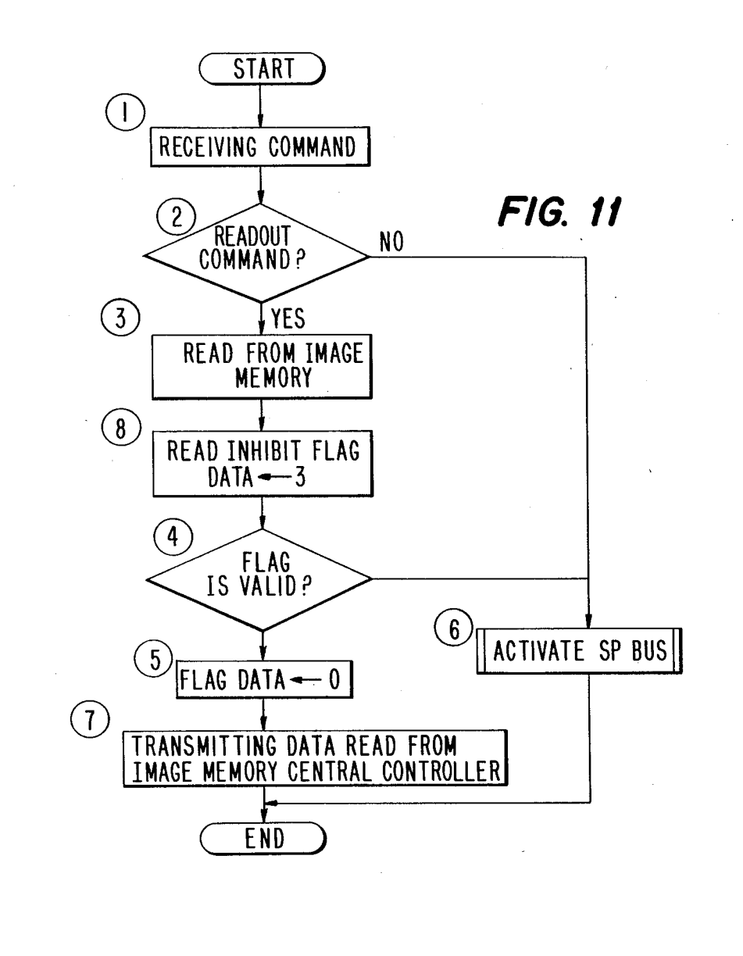
FIGS. 11, 12 and 13 are additional flow charts for explaining the operation of FIG. 4.
Figure 12:
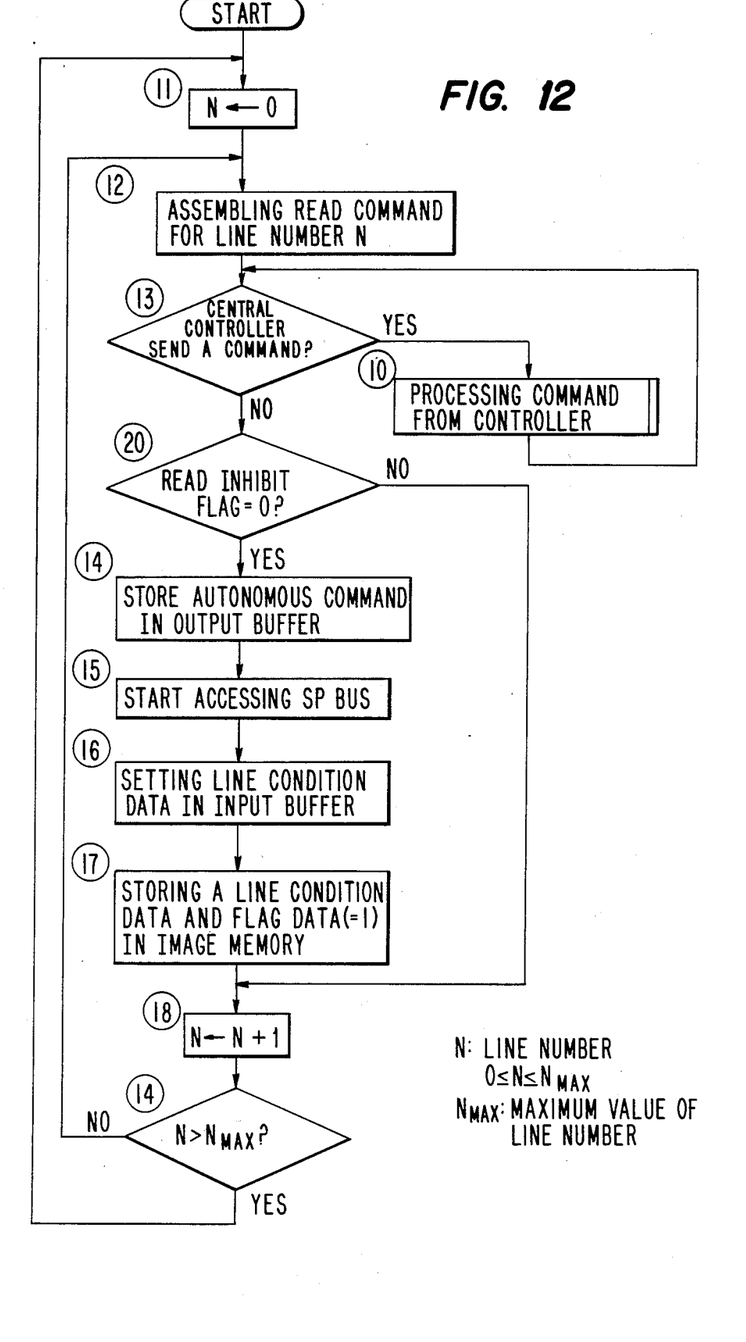
Figure 13:
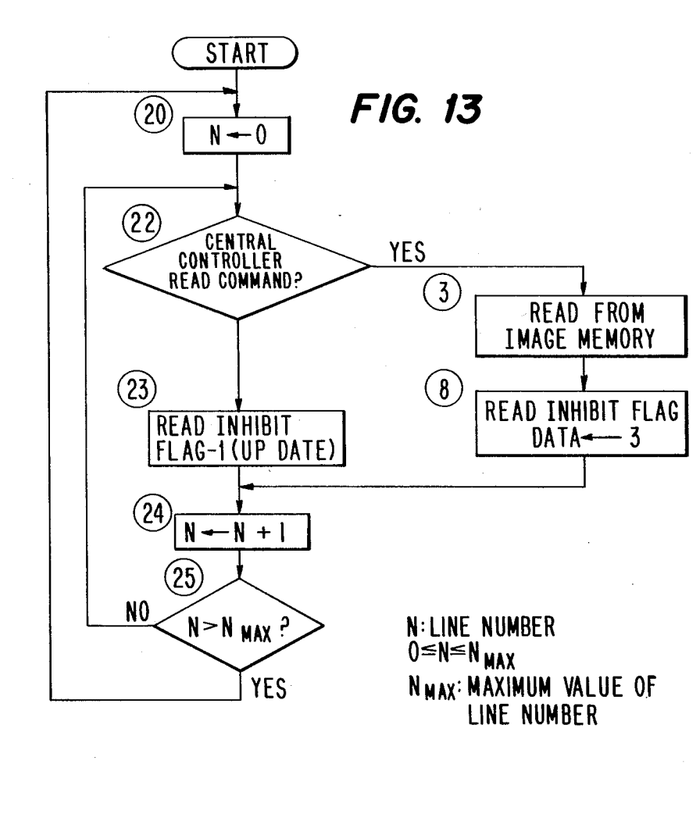

Next, the processing flow of the image memory controller 9 of the first embodiment will be explained with reference to FIGS. 11, 12 and 13. FIG. 11 is a flow chart of the processing of commands from the central controller 11 in the image memory controller 9. This flow is different from the processing flow of FIG. 5 in that step ⑧ is provided between step ③ and step ④. Namely, if the image memory 8 is accessed in response to the readout command from the central controller 11, the autonomous read inhibit flag (FLAG2) corresponding to the address (line number) of the image memory 8 is set to "3".

The operation of the image memory controller 9 in autonomously reading the line condition data will now be explained with reference to FIG. 12. FIG. 12 differs from FIG. 7 in that step ⑳ is provided between steps ⑬ and ⑭. That is, when the readout command is received from the central controller 11, the autonomous read inhibit flag of the corresponding line number is checked to determine whether or not it is "0". When the read inhibit flag is "0", processing in the image memory controller 9 skips to step ⑱ without execution of an autonomous readout operation. Next, the procedure for updating of the autonomous read inhibit flag which is a characteristic part of the second embodiment will be with reference to FIG. 13. FIG. 13 replaces steps ② and ⑧ in FIG. 11 which update the autonomous read inhibit an individual period. When a read command from the central controller 11 is detected in step ㉒, steps ③ and ⑧ are executed and operation returns to step 24. If the read command is not received, processing continues with step ㉓. At step ㉓ the autonomous read inhibit flag corresponding to the line number N in the autonomous read inhibit means 30 is decremented by one. The line number N is then incremented by one in step ㉔ and tested in step ㉕ to determine whether or not it exceeds the maximum line number $N_{MAX}$. When all of the autonomous read inhibit flags have been updated ($N>N_{MAX}$), operation shifts to step ㉑ and the line number N is reset. Otherwise, when $N\leq N_{MAX}$, processing continues with step ㉒.

When the value of an autonomous read inhibit flag becomes zero, it means that the autonomous read inhibit condition is released, permitting autonomous reading of the corresponding line condition data in the RSM by the image memory controller 9. In other words, when the autonomous read inhibit flag is equal to zero, as described above, an autonomous read operation of the line condition data may be performed. The use of read inhibit flags prevents disturbance of the data sampling period of line condition data.

Figure 14:
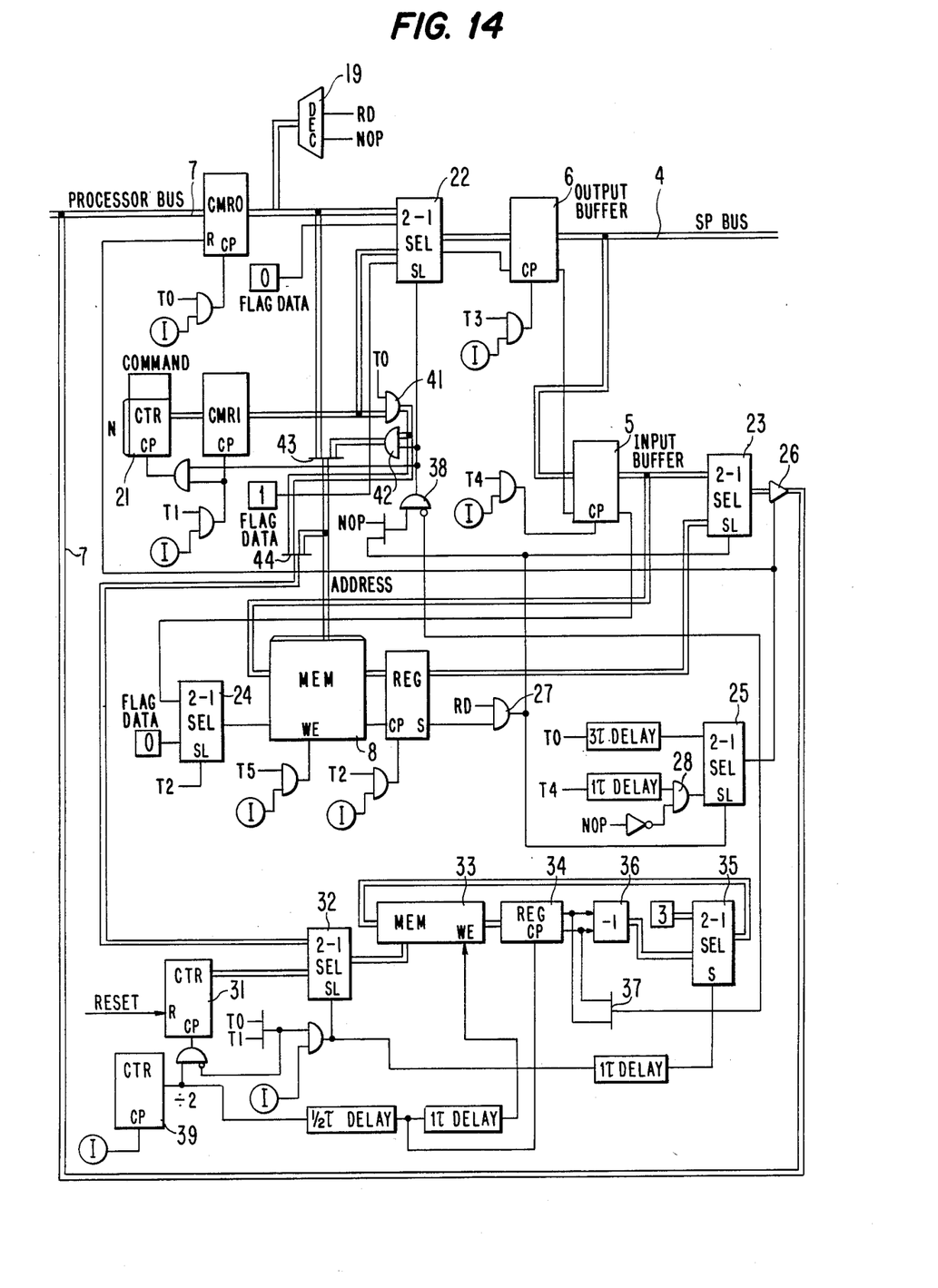
FIG. 14 is a block diagram of a second embodiment of the present invention.
Figure 15:
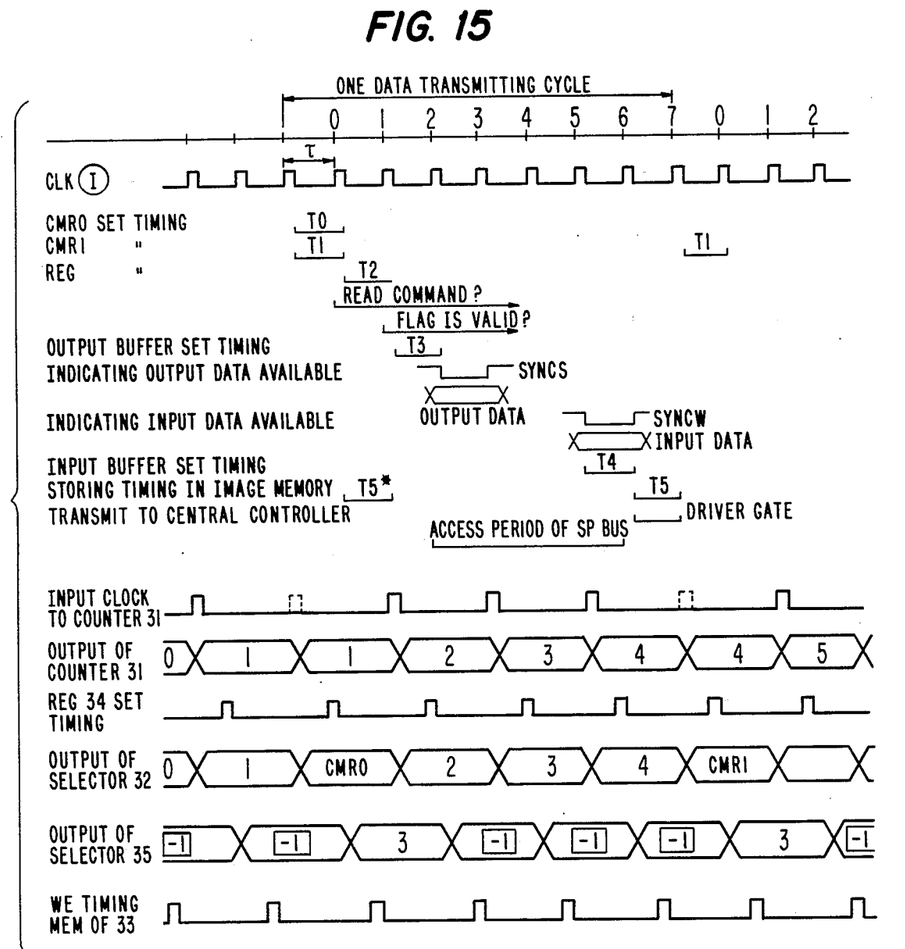
FIGS. 15 and 16 are time charts for explaining the operation of FIG. 14.

Next, the structure and operation of the second embodiment will be explained with reference to FIGS. 14 and 15. FIG. 14 corresponds to FIG. 8A, but includes elements corresponding to the autonomous read inhibit means 30 of FIG. 4, while FIG. 15 is an operation time chart for FIG. 14. The elements in FIG. 14 which are the same as those of FIG. 8A will not be described because they have the same structure and operate in the same way. The clock signal for the autonomous read inhibit means 30 is obtained by dividing the reference clock I by two in counter 39. The line number N which is an address of the memory 33 storing the autonomous read inhibit flags is generated by counter 31 which counts the signal output by the counter 39. Selector 32 selects the commands in CMR0 and CMR1 at time T0 and T1, respectively. Otherwise, the selector 32 selects the output of the counter 31. The output of selector 32 is input as the address of memory 33 storing the autonomous read inhibit flag. The memory 33 stores a flag value between zero (0) and three (3) and the flag value corresponding to the addressed line number is stored in register 34 with a $\frac{1}{2}\tau$ delay of the clock signal output by the counter 39.

The read inhibit flag is 2-bit data. The flag value stored in the register 34 is decremented by one in subtractor 36 and is then input to the selector 35. The selector 35 selects the output of the subtractor 36 with a $1\tau$ delay except when timing signals T0 and T1 are generated. An updated flag or a flag value of three (3) is thus written with a $1\frac{1}{2}\tau$ delay to the memory 33 at the address used during the readout operation.

Next, when the readout command is transmitted from the central controller 11 in response to timing signal T0 or the autonomous readout command is transmitted in response to the timing signal T1, the readout command, including the line number, is stored in CMR0 or CMR1, respectively. When timing signal T0 is generated, the contents of CMR1 are rejected by AND gate 41. Thereby, contents of CMR0 are input to the selector 32 through the OR gate 44. At other times, nothing is stored in CMR0 and therefore the contents of CMR1 are input to the selector 32. Since the selector 32 selects and outputs the contents of CMR0 and CMR1 in response to the timing signals T0 and T1, respectively the line number N in the readout command in CMR0 or CMR1 is used as the address of the read inhibit flag memory 33. When a line number N from CMR0 is selected, as indicated in the flowchart of FIG. 13 the autonomous read inhibit flag is set to "3" in order to inhibit the image memory controller 9 from accessing the line condition data corresponding to this line number for the next three times. Therefore, in response to the signal obtained by delaying the timing signals T0 and T1 for the period of $1\tau$, the selector 3 selects the flag data "3" to be stored in the memory 33.

During the period when the autonomous read inhibit flag is "1", "2" or "3", i.e., other than "0", the autonomous read operation is inhibited. That is, when the value of the flag read from the memory 33 is not "0", the output of OR gate 37 has the value "1" and the output of AND gate 38 is "0". Accordingly, the selector 22 selects the contents of CMR0 (which is reset), instead of CMR1. Thus, the autonomous readout command is not transmitted to the SP BUS 4. Therefore, the autonomous readout operation is inhibited for two to three periods after a readout command for the corresponding line number is carried out by the central controller 11. Thereby, an autonomous readout operation is not carried shortly after the central controller 11 performs a readout operation for the same line and, accordingly, the detection timing is not disturbed. The ordinary detection period (when no "off-hook" conditions are present) is at least three times longer than the short detection period used when an "off-hook" has been detected. Thus, the autonomous readout operation can be started again when the readout operation in the short period is completed.

Figure 16:
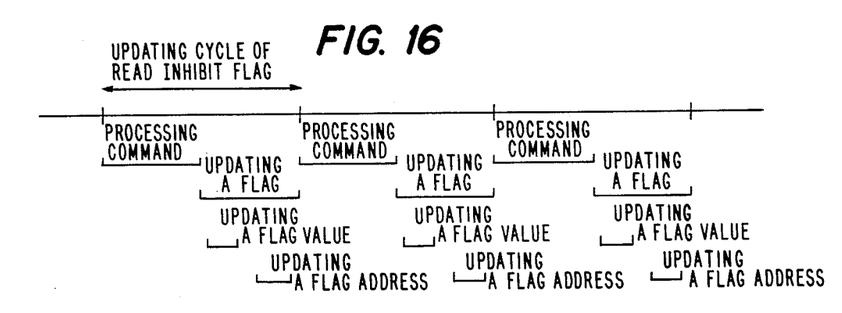

FIG. 16 illustrates the condition that the autonomous readout operation is inhibited for the specified period by the autonomous read inhibit means 30. One autonomous readout inhibit flag updating period is selected as:

$$\text{(Short detection period)/(Maximum line number)} \tag{1}$$

The above equation (1) indicates that all inhibit flags are read out from the memory and updated in a short detection period. Therefore, an inhibit flag is updated when corresponding condition data is autonomously collected and other inhibit flags are also updated until the next access by the control circuit 11. As a result, all inhibit flags are always in the same condition whenever the control part 11 collects condition data.

The many features and advantages of the present invention are apparent from the detailed specification and thus, it is intended by the appended claims to cover all such features and advantages of the device which fall within the true spirit and scope of the invention. Further, since numerous modifications and changes will readily occur to those skilled in the art, it is not desired to limit the invention to the exact construction and operation illustrated and described. Accordingly, all suitable modifications and equivalents may be resorted to falling with the scope and spirit of the invention.

What is claimed is:

1. A line condition data collection system for a telephone exchange, comprising:
   signal receiving memory means for holding line condition data of a plurality of lines; and
   processing means for periodically collecting the line condition data and for controlling the telephone exchange, comprising:
      central control means for executing commands controlling execution of said processing means, the commands including a readout command; and
      image memory means for sequentially reading the line condition data from said signal receiving memory means independently of the commands executed by said central control means, for storing validity flags, corresponding to the line condition data, indicating whether the line condition data stored in said image memory means is valid and, in response to execution of the readout command by said central control means, for supplying specific line condition data stored in said image memory means to said central control means if a corresponding validity flag indicates that the specific line condition data is valid.

2. A system as recited in claim 1, wherein said image memory means resets the corresponding validity flag to indicate that the specific line condition data is invalid if the specific line condition data is supplied to said central control means from said image memory means.

3. A system as recited in claim 2, wherein said image memory means requests access to the specific line condition data stored in said signal receiving memory means if the corresponding validity flag indicates that the specific line condition data stored in said image memory means is invalid.

4. A system as recited in claim 3, wherein the specific line condition data read from said signal receiving means is stored in said image memory means and the corresponding validity flag is set to indicate that the specific command condition data is invalid.

5. A system as recited in claim 1, wherein said image memory means comprises:
   an image memory for storing the line condition data and the validity flags corresponding thereto;
   image memory control means for controlling access to said image memory;
   a read inhibit flag memory for storing read inhibit flags corresponding to the line condition data; and
   read inhibit flag control means for setting a corresponding read inhibit flag when said image memory means accesses said signal receiving memory means in response to the readout command from said central control means, for resetting the corresponding read inhibit flag after a predetermined amount of time and for preventing the sequential reading of the line condition data by said image memory means when the corresponding read inhibit flag is set.

6. A system as recited in claim 5, wherein the telephone exchange has a maximum number of lines,
   wherein said central control means performs the readout command with a data collecting period, and
   wherein the predetermined amount of time for resetting the corresponding read inhibit flag is determined in dependence upon the data collecting period of said central control means and the maximum number of lines in the telephone exchange.

7. A system as recited in claim 1,
   further comprising a slow speed bus operatively connected to said signal receiving memory means and said image memory means, and
   wherein said processing means further comprises a processor bus operatively connected to said image memory means and said central controller means.

8. A system as recited in claim 7, wherein said image memory means performs the sequential reading of the line condition data when said slow speed bus is available.

9. A system as recited in claim 2, wherein said image memory means comprises:
   autonomous read command means for sequentially and autonomously accessing said signal receiving means when said slow speed bus is available;
   central control command means for receiving slow speed bus commands, including the readout command, from said central controller via said processor bus and for determining whether the readout command has been received;
   an image memory for storing the line condition data and the validity flags at addresses specified by the central control command means; and
   selection means for accessing said slow speed bus in response to receipt of a non-readout slow speed bus command from said central control means, for requesting access to the specific line condition data when the readout command has been received from said central control means and the corresponding validity flag is invalid and for otherwise accessing the slow speed bus for the sequential reading of the line condition data.

10. A system as recited in claim 9,
    wherein said image memory means further comprises:
    a read inhibit flag memory, operatively connected to said selection means, for storing read inhibit flags corresponding to the line condition data; and
    read inhibit flag control means for setting a corresponding read inhibit flag when the specific line condition data is read from said signal receiving memory means instead of from said image memory and for resetting the corresponding read inhibitflag after a predetermined amount of time, and
    wherein said selection means prevents reading of the specific line condition data when the corresponding read inhibit flag is set.

* * * * *